United States Patent [19]
Gast et al.

[11] Patent Number: 4,512,549
[45] Date of Patent: Apr. 23, 1985

[54] MAGNETIC VALVE

[75] Inventors: Theodor Gast, Berlin; Hans Kubach, Korntal; Kurt Binder, Stuttgart, all of Fed. Rep. of Germany

[73] Assignee: Robert Bosch GmbH, Stuttgart, Fed. Rep. of Germany

[21] Appl. No.: 411,715

[22] Filed: Aug. 25, 1982

[30] Foreign Application Priority Data

Sep. 16, 1981 [DE] Fed. Rep. of Germany ....... 3136734

[51] Int. Cl.³ .............................................. F16K 31/02
[52] U.S. Cl. ..................................... 251/137; 251/65; 335/234
[58] Field of Search .................. 251/137, 65; 335/229, 335/230, 234

[56] References Cited

U.S. PATENT DOCUMENTS

| | | | |
|---|---|---|---|
| 3,070,730 | 12/1962 | Gray et al. | 335/229 |
| 3,119,940 | 1/1964 | Pettit et al. | 335/229 X |
| 3,178,151 | 4/1965 | Caldwell | 251/137 |
| 3,814,376 | 6/1974 | Reinicke | 251/65 |
| 4,142,684 | 3/1979 | Schweitzer | 239/585 |
| 4,342,443 | 8/1982 | Wakeman | 251/137 |

Primary Examiner—A. Michael Chambers
Assistant Examiner—John C. Fox
Attorney, Agent, or Firm—Edwin E. Greigg

[57] ABSTRACT

A magnetic valve in which two cylindrical soft-iron cores are provided which are disposed parallel to one another. The soft-iron cores are each surrounded by a coil. An armature of magnetically conductive material which carries a valve body is caused to move inside the soft-iron cores. Between the two coils, an axially magnetized permanent magnet is disposed in circular-annular fashion. The soft-iron cores have a magnetic short-circuit connecting them with one another.

7 Claims, 3 Drawing Figures

U.S. Patent    Apr. 23, 1985    4,512,549
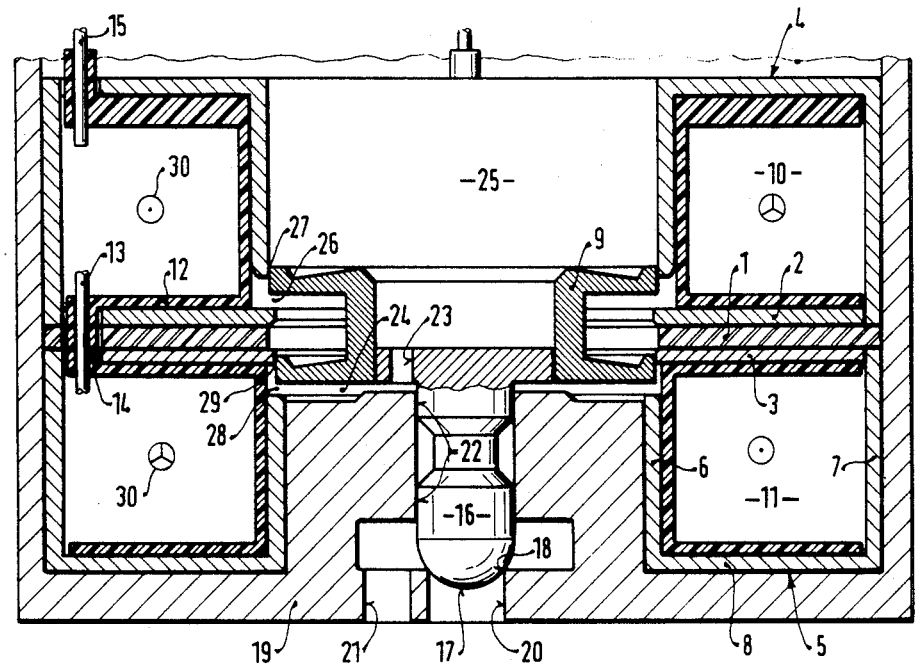
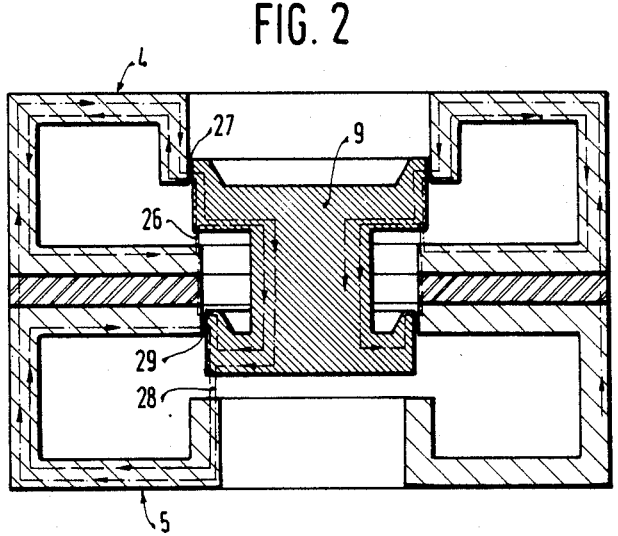
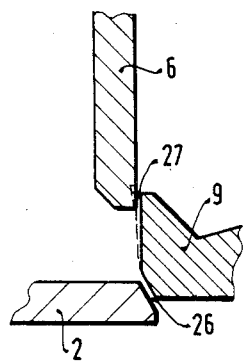

MAGNETIC VALVE

BACKGROUND OF THE INVENTION

The invention is based on a magnetic valve having at least one, preferably cylindrical, soft-iron core surrounded by a coil and with an armature of magnetically conductive material, which carries a valve body, and further having a permanent magnet for reinforcing the armature movement.

A magnetic valve is known from British Pat. No. 1,490,033, the valve body of which is embodied as a ball of magnetically conductive material. A bar magnet which is magnetized in the longitudinal direction is disposed above the ball. The bar magnet is surrounded by a body of nonmagnetic material. Above the nonmagnetic body, there is a magnetic core, which is disposed coaxially with the bar magnet and surrounded by a coil. If the coil receives no electrical signals, then the ball is attracted by the bar magnet, which has different poles on its two ends, and thus remains in contact with the bar magnet. At the same time, the core is magnetized, so that the core and the bar magnet attract one another and the bar magnet strikes against the nonmagnetic body, which is located partially between the core and the bar magnet; the valve is thus in the opened state. If the coil experiences a flow of electrical current through it, a magnetic field is established in the core, causing a reversal of the magnetic poles of the core and causing the bar magnet with the ball to be repelled by the core. The ball is pressed against the valve seat, so that the valve is closed. This arrangement has the disadvantage that the advantages of the permanent-field excitation are not exploited, since the energy of the magnetic field, which takes part in the transformation of energy, encompasses only a very small part of the field energy. Among other reasons, this is because the useful magnetic field appears substantially in a magnetic circuit over large sections of which there is high magnetic resistance.

OBJECT AND SUMMARY OF THE INVENTION

The magnetic valve according to the invention has the advantage over the prior art that the magnetic resistance in the useful magnetic circuit is reduced to a low level by the use of high-grade magnetic conductors. The magnetic resistance is high only in the working air gaps, so that the field energy is concentrated at these gaps. At the same time, because of the low magnetic voltage drops in the useful circuit, the magnetic voltages across the magnetic leakage gap are reduced, so that the leaked energy, which does not contribute to useable force, can be reduced.

Advantageous further embodiments of and improvements to the magnetic valve can be attained by further characteristics revealed hereinafter. As a result of the four air gaps, the force which must be exerted at each gap is reduced, while the total force remains the same. Because of the axial magnetization of the permanent magnet, it is possible to use anisotropic magnets, which are favorable in cost and capable of high output. Since the two coils are wound on a common, rigid coil body, the assembly of the magnetic system is made no more difficult despite the great number of air gaps. On account of the saturation of the magnetic flux in the armature, the permanent flux is stabilized when confronted with changes in the polarization of the permanent magnet, which may occur as a function of temperature, for instance. The described arrangement of the working air gaps enables the installation of the armature after the nonmovable part of the magnetic system has been rendered functional. By means of specialized realizations of the working air gaps, the characteristic curve of force can be influenced via the valve seat in accordance with the stroke.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 is a cross sectional view taken through the magnetic valve;

FIG. 2 is a schematic illustration of the course of the magnetic fluxes; and

FIG. 3 shows a fragmentary view of a further possible arrangement of the air gaps.

DESCRIPTION OF THE PREFERRED EMBODIMENT

The fast-switching magnetic valve according to the invention is used in motor vehicle fuel injection pumps, by way of example.

In FIG. 1, the permanent magnet 1 is embodied as a circular-annular disc having axial magnetization. Above the permanent magnet 1 and also in circular-annular form is a first magnetic conductor disc 2, a second magnetic conductor disc 3 being located below the permanent magnet 1. Because of the axial magnetization, the first and second magnetic conductor discs 2, 3 have different magnetic poles; for instance, the first magnetic conductor disc 2 is embodied as a north pole and the second magnetic conductor disc 3 is embodied as a south pole. The permanent magnet 1 and the first and second magnetic conductor discs 2, 3 are connected with a first soft-iron core 4 and a second soft-iron core 5. The soft-iron cores 4, 5 are embodied respectively as two hollow cylinders 7, 6 located concentrically relative to one another, which are connected to one another on one end face via a magnetically conductive cover plate 8. The height of the outer cylinders 7 is greater than that of the inner cylinders 6. The first and second soft iron cores 4, 5 are located opposite one another at their open end faces; the permanent magnet 1 and the magnetic conductor discs 2 and 3 are disposed between them, and the outer hollow cylinders 7 abut the permanent magnet 1. The first and second magnetic conductor discs 2, 3 are each magnetically connected to one another with the first and second soft-iron cores 4, 5 in such a manner that with their rims they abut the respective outer cylinders 7. As a result of this arrangement, the soft-iron cores become different magnetic poles; for instance the first soft-iron core 4 is a north pole and the second soft-iron core 5 is a south pole.

Inside the inner hollow cylinders 6 of the soft-iron cores 4, 5 there is an armature 9 of magnetically conductive material, which is embodied as a hollow cylinder having radially offstanding flanges at the ends. The flanges of the armature 9, together with the soft-iron cores 4, 5 and the magnetic conductor discs 2, 3 form respective air gaps. A first air gap 26 is located between the armature 9 and the first magnetic conductor plate 2 and a third air gap 28 is located between the armature 9 and the second soft-iron core 5, parallel to the direction in which the valve exerts force. A second air gap 27 is located between the armature 9 and the first soft-iron core 4, and a fourth air gap 29 is located between the armature 9 and the second magnetic conductor disc 3, perpendicular as that in which force is exerted by the valve. The space between the outer hollow cylinder 7 and the inner hollow cylinder 6 of the respective soft-iron core 4, 5 is filled with a first and a second conductor coil 10, 11, respectively, the coils being wound in opposite directions from one another. The coils 10, 11 are wound upon a common, electrically insulating coil body 12. The coils 10, 11 are connected to one another via conductor wires 13. The conductor wires 13 each pass over one bridge 14 of the coil body 12. The permanent magnet 1 and the magnetic conductor discs 2, 3 are appropriately recessed at the locations of the bridges 14. The recesses are advantageously embodied such that during assembly and before being placed in the housing 19, the permanent magnet 1 and the two magnetic conductor discs 2, 3 can be pushed from the front (as seen in the plane of FIG. 1) into the wound coil body 12 in a direction such that the recessed locations are opposite the bridge 14. Then the soft-iron cores 5, 4 are pushed into place. One of the two electrical supply lines for the first coil 10 is shown at 15.

The armature 9 carries a valve push rod 16 of antimagnetic material. A hemispherical cap 17 is located on the valve push rod 16 and enables the valve seat 18 in the housing 19, which is of antimagnetic material, to open or close hydraulically. The hydraulic inflows and outflows are marked 20, 21, respectively. The valve push rod 16 is axially guided in the housing 19 at the bearing points 22, so that the bearing points 22 and the valve seat 16 are in exact alignment. In its upper portion, the valve push rod 16 has a bore 23, which connects the hollow chamber 24 with the exterior chamber 25. The fluid, for instance fuel, located in the hollow chamber 24 is capable of escaping easily toward the bottom through the bore 23 during the stroke of the armature 9.

With the aid of FIG. 2, which illustrates the course of the magnetic fluxes in the magnetic valve, the mode of operation of the magnetic valve will now be described.

If the coils 10, 11 experience a flow through them of electric current, then in addition to the permanent magnetic field indicated by dot-dash lines in FIG. 2, a further magnetic field is established, which is shown in dashed lines in FIG. 2. Because of the low magnetic conductivity of the permanent magnet 1 and the greater conductivity of the magnetic conductor discs 2, 3, the magnetic field brought about by the electric current is closed via the first and second soft-iron cores 4, 5, the first and second magnetic discs 2, 3, via the first air gap 26 and correspondingly via the fourth air gap 29, via the respective portion of the armature 9 and via the second air gap 27 and correspondingly via the third air gap 28, respectively. If the conductor coils 10, 11 experience a flow of electric current through them in the direction marked 30 in FIGS. 1 and 2, then in the first and third air gap 26, 28 their magnetic field is added to that of the permanent magnet 1; in the second and fourth air gaps 27, 29, on the other hand, the magnetic fields are in the opposite direction, so that in the extreme case the total flux in the second and fourth air gap 27, 29 becomes zero. An addition of the fields reinforces the magnetic attraction, while a subtraction of the fields corresponds to an attenuation of the field, so that by the influence of the electric current, a supplementary force is exerted downward (as seen in the plane of the drawing) upon the armature 9. Upon a reversal of the electric current, the direction of the magnetic field created by this current also reverses; in other words, in the first and third air gap 26, 28 a subtraction of the magnetic fields takes place, while in the second and fourth air gap 27, 29, the magnetic fields are added together.

For the instance of low magnetic saturation of the armature 9 in the vicinity of the magnetic fluxes—this case is assumed for the course of the magnetic fluxes as shown in FIG. 2—the magnetic field established by the permanent magnet 1 should be independent of temperature or time. This independence is attained by means of high-grade permanent magnets. If the armature 9 is driven in a state of saturation in the vicinity of the magnetic fields, then the constancy of the magnetic field of the permanent magnet 1 is of relatively little significance, and inexpensive permanent magnets can be used.

Upon the superposition of the permanent magnet field $\phi_P$ and the magnetic field $\phi_S$, established by the current through the coils 10, 11, the total force is defined by the following equation:

$$F \sim (\phi_P + \phi_S)^2 = \phi_P^2 + 2\phi_P\phi_S + \phi_S^2$$

and the variation in the force caused by the magnetic field of the coil is defined as:

$$\Delta F = 2\phi_P\phi_S + \phi_S^2$$

In other words, the force variation caused by the flux $\phi_S$ of the coil of the electromagnet is reinforced with the flux $\phi_P$ of the permanent magnet 1. Thus, given a constant force requirement and a large magnetic flux $\phi_P$ of the permanent magnet 1, the energy of the magnetic field $\phi_S$ linked with the electromagnet can be reduced in comparison with a system lacking a permanent magnetic field. Given identical air gaps in the two systems, the result is a reduction of the inductivity of the permanent-field magnetic system, so that in the ideal case, the system would not draw any electrical energy until just when the energy is also being put out to perform mechanical work in terms of movement.

In the present case, the magnetic valve is designed with four air gaps 26, 27, 28, 29. The greater number of air gaps reduces the force which must be applied at each gap, although the total force remains the same; that is, given an identical gap diameter, a smaller flux is required per gap, and thus the gap width is reduced as well. The gap width is approximately equal to the thickness of the magnetic conductors, so that they in turn can be reduced in size. The time constant of the speed of penetration of the magnetic flux into the magnetic conductors is, because of the eddy currents, proportional to the square of the gap width if the electrical resistance of the magnetic conductors remains the same. Therefore a smaller gap width also produces a shorter time constant for the speed of penetration.

The first and third air gap 26, 28 are disposed parallel to the force direction. As shown in FIG. 2, the force at these gaps is in the positive direction (downward in the plane of the drawing) if the electric current is positive. Since when the valve is closed (valve stroke equal to zero) the first and third air gap 26, 28 are minimal in size, then particularly low electromagnetic voltages (generated by the electric current intensity) are sufficient for a given force, and the force can then be maximized by taking steps to keep the magnetic leakage low. The low magnetic voltages reduce the holding current for the valve. With this positive current, the second and fourth air gap 27, 29 are subjected to a permanent flux in the opposite direction from the electromagnet flux, so that saturation of the magnetic conductors is prevented. Because of the constructively selected small radial gaps, the result thus is a small magnetic voltage drop at the air gaps 27, 29. Since in the closed state of the valve all the air gaps thus have a small magnetic voltage drop, the behavior of the first and third air gaps 26, 28 and of the second and fourth air gaps 27, 29 are augmented in such a manner that in the closed state of the valve, a large holding force exists with a low positive current. Upon a reversal of the electric current, the force becomes negative, because the electromagnet flux and the permanent magnet flux are added together in the second and fourth air gap 27, 29 and are subtracted from one another in the first and third air gap 26, 28. Thus the force is primarily brought to bear by the second and fourth air gap 27, 29, and the magnetic conductors in the vicinity of the second and fourth air gap become very highly saturated magnetically, especially in the closed state of the valve. Thus a high transformation of energy occurs, with great force, at the second and fourth air gap 27, 29, especially when the valve is in the closed state. The magnetic voltage drop of the electromagnetic circuit is, as discussed above, particularly low at the first and third air gap 26, 28, which at this time are relatively ineffective, in the closed state of the valve. Thus only a little field energy has to be built up in order to provide for the rapid dropping of the valve when the electric current is negative. It is particularly advantageous that highly permeable magnetic conductors can be triggered up to the point of saturation, as a result of which a very large mechanical work capacity is attained with relatively small field energies.

FIG. 3, as a detail of FIG. 1, shows a specialized arrangement of the first and second air gap 26, 27. The first air gap 26, as in FIG. 1, is located between the first magnetic conductor plate 2 and the armature 9, and the first magnetic conductor disc 2 and the armature 9 are embodied as conical in the vicinity of this first air gap 26. By means of this arrangement, the characteristic curve of the force can be influenced in accordance with the stroke. The characteristic curve of the force can furthermore be influenced in accordance with the stroke by means of a specialized embodiment of the second air gap, specifically that this gap is larger in the region in which the armature 9 and the inner hollow cylinder 6 of the first soft-iron core 4 overlap one another in the open state of the valve than in the region in which the armature 9 and the first soft-iron core 4 already overlap one another in the closed position of the valve. This possibility is shown in FIG. 3 by dashed lines.

Although FIG. 3 shows only a detail of the first and second air gap 26, 27, still what is said above applies equally to the third and fourth air gap 28, 29.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A magnetic valve having at least one soft-iron core means and further provided with a movable armature of magnetically conductive material, which carries a valve body, and a disc shaped permanent magnet surrounding said armature and interposed between oppositely disposed fixed first and second magnetic conductor disc elements of which said permanent magnet is in magnetic contact for reinforcing movement of said armature positioned in proximity thereto, characterized in that said soft-iron core means comprises first and second soft-iron cores which are disposed parallel to one another, each of said cores arranged to surround a coil member, said armature is formed as an annular element adapted for reciprocable movement under influence of a magnetic field established by said coil members, said permanent magnet, said magnetic cores and said disc elements, each of said conductor disc elements having portions physically in contact with said soft-iron core means and in magnetic contact therewith, and a first air gap disposed between said armature and the first magnetic conductor disc element, a second air gap disposed between said armature and said first soft-iron core, a third air gap disposed between said armature and said second soft-iron core and a fourth air gap disposed between said armature and said second magnetic conductor disc element with said first and third air gaps disposed parallel to the direction of said armature movement, and said second and fourth air gaps are disposed perpendicular to the direction of said armature movement.

2. A magnetic valve as defined by claim 1, characterized in that said magnetic conductor disc elements have a high magnetic conductability.

3. A magnetic valve as defined by claim 1, characterized in that said armature, said first magnetic conductor disc element and the second soft-iron core are embodied as conical in those areas in which they form said first and third air gap.

4. A magnetic valve as defined by claim 1, characterized in that said second and fourth air gaps are larger in those areas which are overlapped by said armature only in the opened state of said valve than in those areas which are already overlapped by said armature in the closed state of said valve.

5. A magnetic valve as defined by claim 1, characterized in that said coils are wound in opposite directions and are disposed on one coil body.

6. A magnetic valve as defined by claim 1, characterized in that said armature further includes predetermined magnetic circuits and subsequent to formation thereof said armature is placed into said magnetic valve in an axial direction.

7. A magnetic valve as defined by claim 1, characterized in that said armature is driven in a state of magnetic saturation.

* * * * *